United States Patent [19]
Kilham

[11] 3,913,527
[45] Oct. 21, 1975

[54] HUMMINGBIRD FEEDER

[75] Inventor: Peter Kilham, Barrington, R.I.

[73] Assignee: Droll Yankees, Inc., Foster, R.I.

[22] Filed: July 1, 1974

[21] Appl. No.: 484,714

[52] U.S. Cl.............................................. 119/51 R
[51] Int. Cl.².................................... A01K 39/00
[58] Field of Search.................... 119/77, 51 R, 61

[56] References Cited
UNITED STATES PATENTS

| | | | |
|---|---|---|---|
| 2,866,435 | 12/1958 | Blazier | 119/77 X |
| 3,125,069 | 3/1964 | Fowler | 119/77 X |
| 3,292,589 | 12/1966 | Williams | 119/77 |

*Primary Examiner*—Hugh R. Chamblee
*Attorney, Agent, or Firm*—Salter & Michaelson

[57] ABSTRACT

A hummingbird feeder comprising a top wall and bottom wall defining a reservoir having a substantially circular peripheral margin, said top wall sloping upwardly from said peripheral margin and having a feeding station located adjacent to but spaced from said peripheral margin, said feeding station comprising an opening in said top wall and an insert mounted on said top wall and having an elongated tube extending through said opening, said tube being configured and dimensioned so as to permit the relatively long bill of a hummingbird to extend therethrough, while at the same time preventing bees from gaining access to the feeding solution.

7 Claims, 11 Drawing Figures

U.S. Patent   Oct. 21, 1975   Sheet 1 of 2   3,913,527
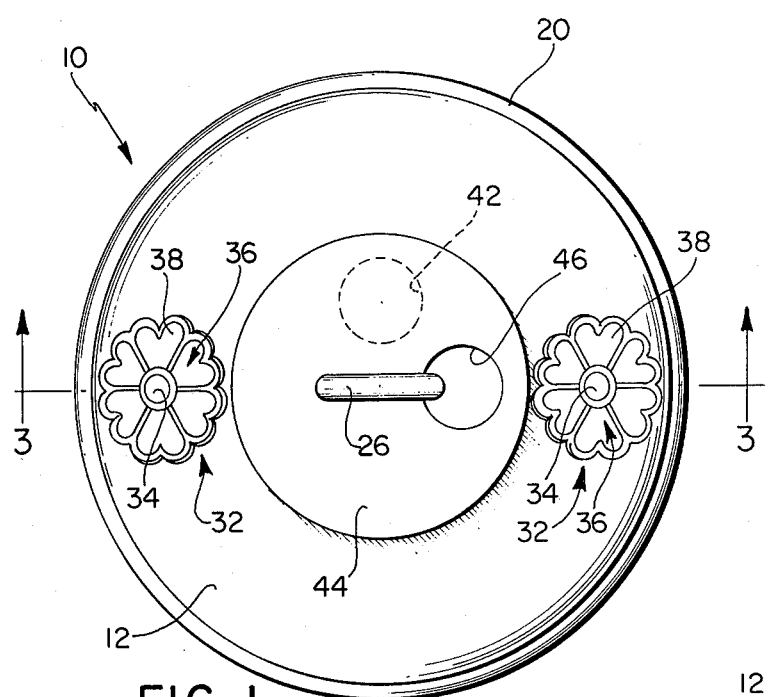
FIG. 1
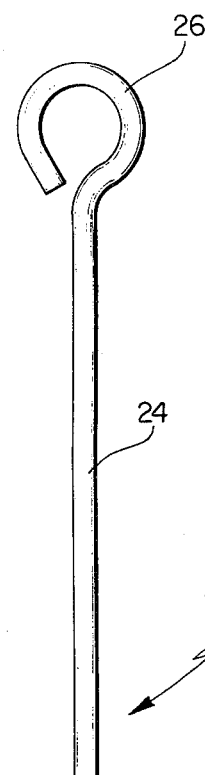
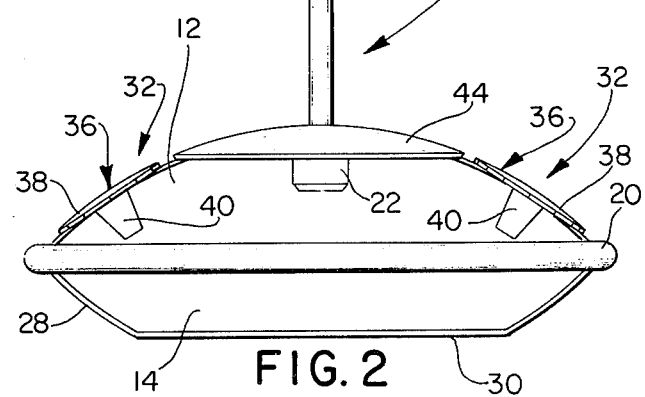
FIG. 2
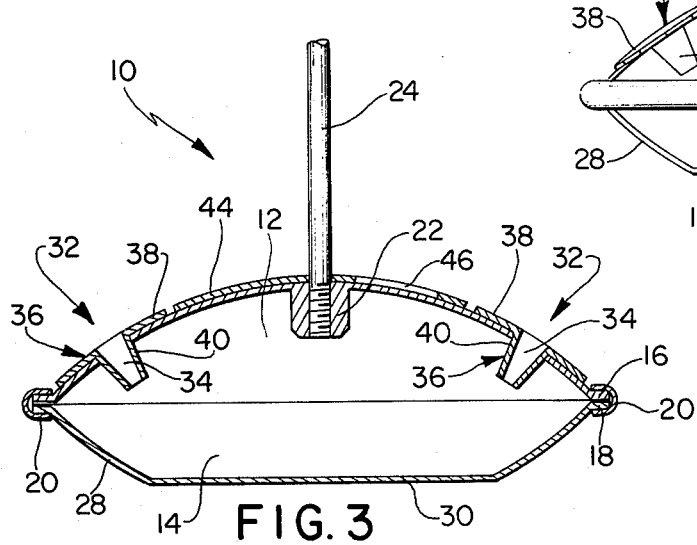
FIG. 3
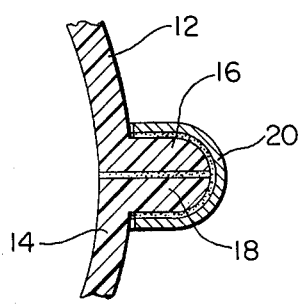
FIG. 4
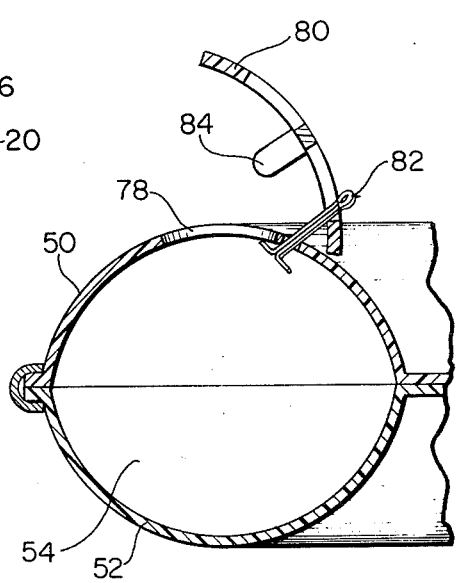
FIG. 11

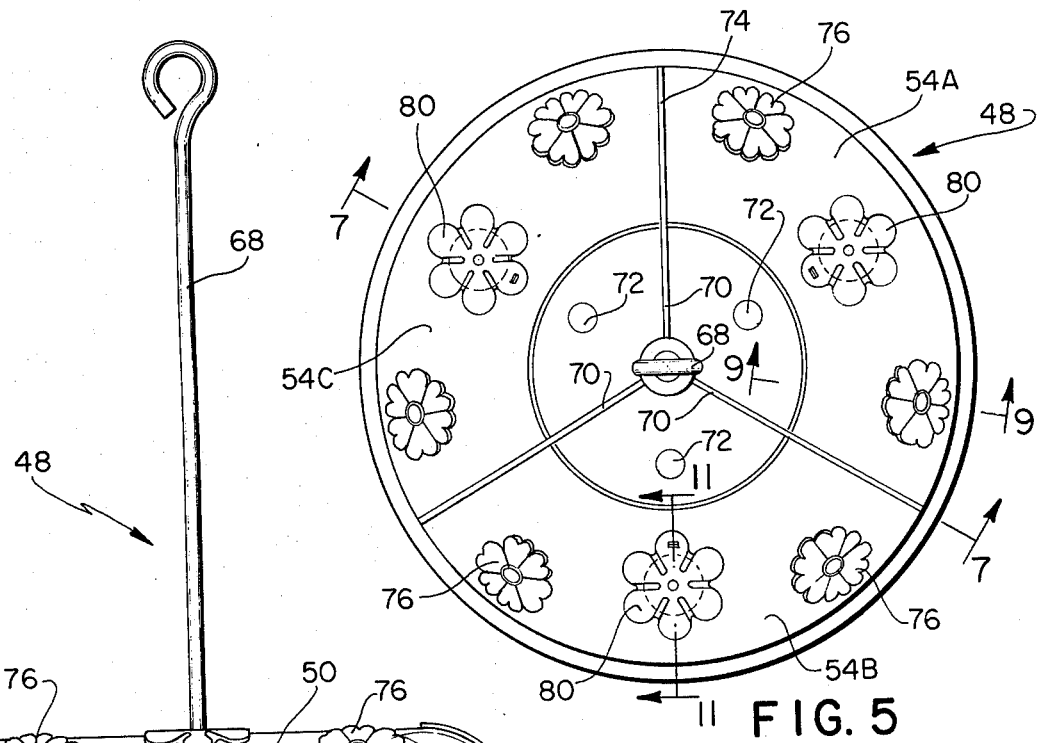
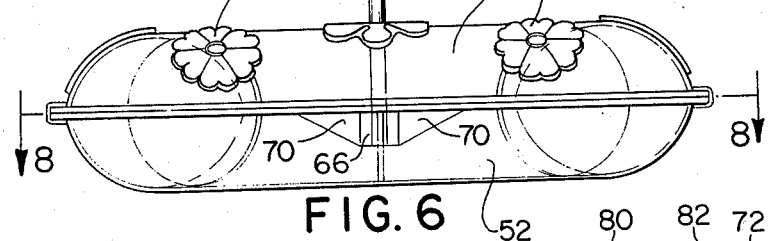
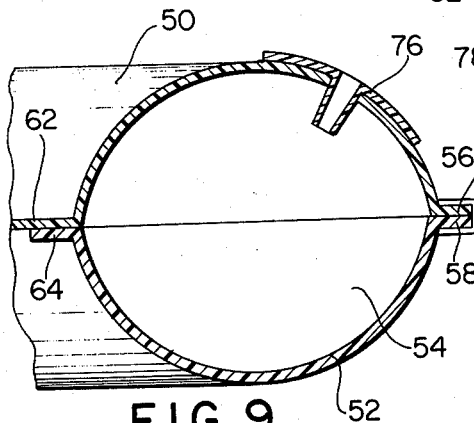
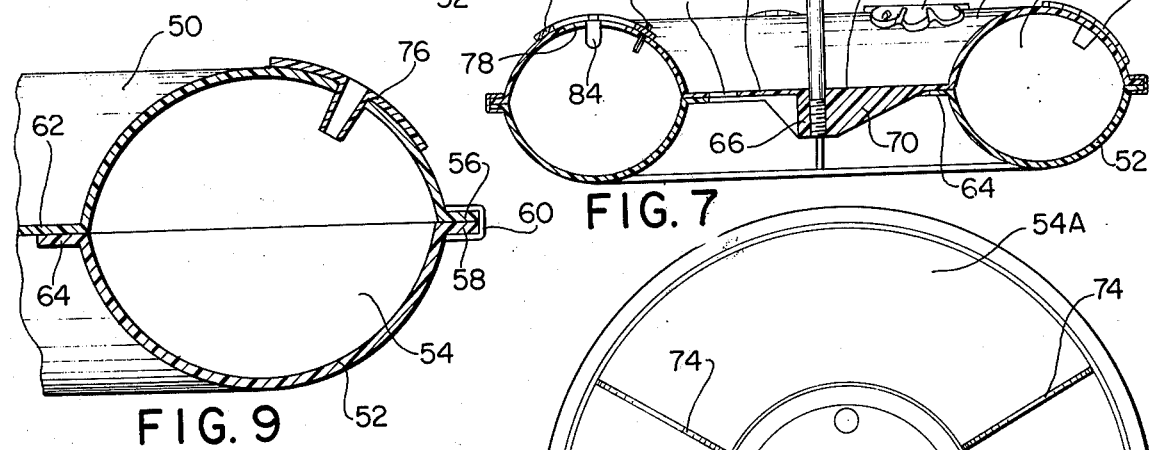
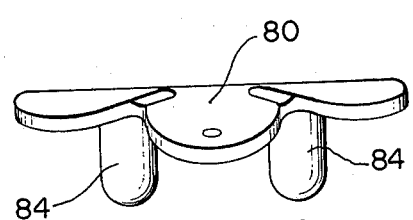
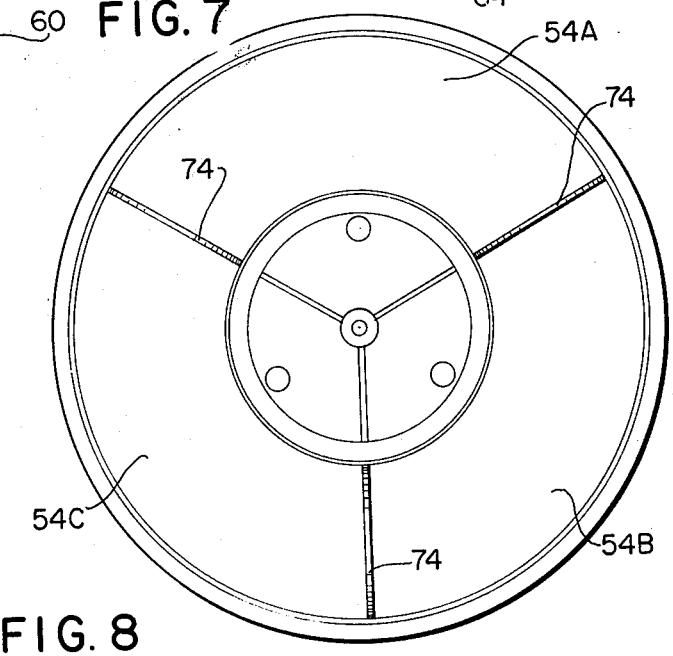

HUMMINGBIRD FEEDER

BACKGROUND AND SUMMARY OF THE INVENTION

As is well known, hummingbirds do not eat conventional bird feed, but rather require a liquid solution comprising sugar and water. As will be obvious, an aqueous sugar solution of this nature is also attractive to bees; and hence it has been found necessary to provide a feeder for hummingbirds which will permit and even encourage feeding of hummingbirds, but at the same time will prevent bees from gaining access to the feed solution.

As will also be obvious, an aqueous sugar solution of this nature will attract ants if the solution is allowed to leak to the outside of the feeder. Accordingly, it is important that the feeder be designed in such a way as to prevent accidental leakage of the aqueous sugar solution.

It is also important that ready and convenient means be provided for permitting refilling of the feeder wherever necessary; and in the case of larger feeders, it has been found desirable to partition the feeder into separate compartments for reasons to be hereinafter set forth.

It is therefore an object of the present invention to provide a feeder especially designed for hummingbirds, which feeder is adapted to receive and maintain an aqueous sugar solution with feeding stations permitting ready and convenient access to the solution by hummingbirds but at the same time preventing undesirable access from bees and the like.

It is a further object of the invention to provide a hummingbird feeder that is constructed of the most part of molded plastic and which is easy and economically feasible to produce and assemble, but which nevertheless is durable and effective in use.

Other features and objects of the present invention will become apparent as the description thereof proceeds when considered in connection with the accompanying illustrative drawings.

DESCRIPTION OF THE DRAWINGS

In the drawings which illustrate the best mode presently contemplated for carrying out the present invention;

FIG. 1 is a top plan view of a hummingbird feeder constructed in accordance with the present invention;

FIG. 2 is a side elevational view thereof;

FIG. 3 is a section taken on line 3—3 of FIG. 1;

FIG. 4 is a fragmentary enlarged detailed view of the peripheral joint that forms a part of the present invention;

FIG. 5 is a top plan view of a modified form of feeder;

FIG. 6 is a side elevational view thereof;

FIG. 7 is a section taken on line 7—7 of FIG. 5;

FIG. 8 is a bottom plan view of the feeder of FIG. 5;

FIG. 9 is an enlarged fragmentary sectional view taken on line 9—9 of FIG. 5;

FIG. 10 is an enlarged elevational view of one of the filling caps used in the feeder shown in FIG. 5; and FIG. 11 is an enlarged fragmentary sectional view showing an assembled filling cap in open position.

DESCRIPTION OF THE INVENTION

Referring to the drawings, and more particularly to FIGS. 1 through 4, there is shown a first embodiment of my invention which is of relatively small size. This small feeder, shown generally at 10, comprises a housing having a top wall 12 and a bottom wall 14, both of which are preferably molded of plastic, such as a clear acrylic. As will be noted, the top walls 12 and 14 each has a substantially circular peripheral margin defined by outwardly extending marginal flanges 16, 18, respectively. As will be seen most clearly in FIGS. 3 and 4, the flanges 16 and 18 mate with each other and are secured to each other by any suitable means, preferably ultrasonic sealing. After securement of the flanges 16 and 18 to each other around the periphery of the walls 12 and 14, an elongated U-shaped channel member 20, preferably of metallic construction, is clamped around said flanges and is secured thereto as by gluing or cementing. The channel member 20 not only insures that a secure, leak-proof seal is present at the marginal edge of feeder 10, but at the same time, this member provides a perch for the hummingbirds. Since the feeder 10 will contain an aqueous sugar solution, this being the solution that is conventionally fed to hummingbirds, it is important that there is no leakage of this solution along the edge of the feeder, since such leakage would quickly attract ants and other undesirable insects. Accordingly, the ultrasonic sealing of the flanges 16 and 18 and the subsequent clamping of said flanges by the channel member 20 insure that no such leakage will take place.

As will be seen, top wall 12 is of a gently rounded or dome shape and at its top central portion is provided with an integral, inwardly extending boss 22 which is internally threaded so as to threadedly receive elongated hang rod 24, said hang rod having a hook portion 26 at its upper extremity to facilitate hanging of the feeder 10 from any suitable support.

Bottom wall 14 has a downwardly and inwardly sloping portion 28 which merges with a bottom flat section 30 whereby the feeder may be easily positioned on a flat surface, if such should become desirable.

Referring again to top wall 12, it will be seen that said top wall is provided with a plurality of feeding stations, shown generally at 32. More specifically, each feeding station comprises an opening 34 located adjacent to but spaced from peripheral flange 16, which openings each receive insert members 36. The insert members 36 each comprise a top flange 38 which is specifically designed to simulate a floral pattern, as shown most clearly in FIG. 1. Depending from flange 38 is a centrally positioned, elongated tube 40 which extends snugly through opening 34 into the interior of the reservoir defined by the walls 12 and 14. As will be noted, the bottom surface of flange 38 engages the outer surface of top wall 12 and is secured thereto by any suitable means, such as cementing or the like. The inwardly extending tube 40 is of decreasing size, as will be seen most clearly in FIGS. 2 and 3, and specifically is provided with a diameter of approximately one-quarter inch at its top end and a diameter of approximately one-eighth inch at its bottom or inner end. The tube 40 is preferably about one-half inch in length, it having been found that these particular dimensions permit the elongated bill of a hummingbird to easily pass therethrough but at the same time prevent access by bees and the like. More specifically, the size of the tube 40 is such that a bee cannot fit therethrough, while the length of the tube is sufficient so that the tongue of a bee cannot extend therethrough to reach the feeding solution contained in the feeder 10.

As above stated, the flange 38 is specifically designed to have a floral pattern and is preferably colored a bright red, it having been found that the color and design simulation of a flower serves to attract hummingbirds. By the same token, the walls 12 and 14, although transparent, are preferably of a greenish color, since this serves as the best background for the red feeding inserts. In other words, by providing a feeding station that simulates a red flower with a greenish background that would suggest the color of grass, maximum enticement of the hummingbirds is achieved.

Adjacent the top central portion of top wall 12, but slightly spaced therefrom, there is provided a filling aperture 42 through which the aqueous sugar solution may be poured when it is desired to fill the feeder 10. In order to cover the filling aperture 42, a domed-shaped disc 44 is rotatably mounted on hang rod 24, said disc abutting and conforming to the curvature of top wall 12, as will be most clearly seen in FIGS. 2 and 3. The cover disc 44 is provided with an opening 46 of generally the same size as the filling aperture 42 and adapted to register with the latter when the disc is rotatably moved so that the openings 42 and 46 are in alignment. In such a position, the aqueous water solution may easily be poured into the feeder 10; and then, after the feeder has been filled to the desired level, which preferably is the level defined by the joint between top walls 12 and 14, the disc 44 is slightly rotated to the position of FIG. 1, for example, whereupon the openings 42 and 46 move out of registry with respect to each other, in which position the filling aperture 42 is covered.

In operation and use, after the feeder 10 has been filled to the desired level, as above described, it will be understood that the hummingbirds will be attracted by the red floral feeding stations 38 and, more specifically, will perch on the peripheral channel member 20, whereupon the birds will be conveniently positioned for their elongated bills to enter through tubes 40 to gain access to the aqueous sugar solution contained in the feeder. It will be noted that the fact that the feeding stations 32 are positioned on the upwardly sloping portion of top wall 12 enhances the accessibility of the feeding stations, since the relationship between the location of the feeding stations and the periphery of the feeder, where the birds will perch, is such as to promote convenient and easy accessibility of the birds to the feeding stations. As stated, the red floral pattern of the flanges 38 on the greenish background helps attract the birds; while the fact that the walls 12 and 14 are transparent enables one to readily ascertain when the level of feeding solution in the feeder has diminished to the point where the feeder should once again be filled. The particular configuration and dimensions of the feeding stations, and particularly the tubes 40, permit easy accessibility of the elongated hummingbird bills but at the same time prevent undesirable access by bees and the like. Also, the ultrasonic sealing of peripheral flanges 16 and 18 and then the provision of the channel member 20 clamped thereover positively prevents any leakage of solution from within the feeder, this being important since, being an aqueous sugar solution, ants will be attracted if there is any leakage.

It has been found that if the ratio of the height of the overall feeder, measured from the top of hang rod 26 to the bottom of the feeder, with respect to the diameter of the reservoir housing, is maintained at approximately three to two or more, then sloshing of the liquid solution in the feeder will be minimized.

Referring now to FIGS. 5 through 11, a modified form of feeder is shown generally at 48, the feeder 48 having a larger capacity than that of the feeder 10. More specifically, the feeder 48 comprises a top wall 50 and a bottom wall 52, which walls, when joined together, form an annular reservoir 54. More specifically, top wall 50 has an outwardly extending peripheral flange 56 which abuts peripheral flange 58 of bottom wall 52 and is sealed thereto, such as by ultrasonic sealing, after which a channel member 60 is clamped thereover, all in a manner identical to that described in connection with the feeder 10. Top wall 50 comprises a central web portion 62, it being noted that bottom wall 52 has inner flanges 64 which are sealed to the under surface of web 62, as shown most clearly in FIGS. 7 and 9. Web portion 62 is provided with a centrally positioned boss 66 which threadedly receives the lower end of hang rod 68, as shown most clearly in FIGS. 6 and 7. For strengthening purposes, a plurality of radially extending ribs 70 extend outwardly from boss 66, terminating just short of the inner edge of flanges 64. For drainage purposes, a plurality of openings 72 are provided in web 62, as shown most clearly in FIGS. 5 and 7.

The annular chamber 54 is provided with a plurality of partitions 74, preferably three in number, which divide the chamber 54 into three separate and distinct feeding compartments, 54A, 54B, and 54C. As will be seen most clearly in FIG. 5, each feeding compartment is provided with a pair of feeding stations 76 which are identical in all respects to the feeding stations 32 of the aforedescribed feeder 10, and hence no further description is deemed necessary. It will be understood, however, that the feeding stations in the feeder 48 are still preferably of a red color and still preferably embody a floral design. Likewise, the walls 50 and 52 are transparent but specifically are colored with a greenish cast.

In order to fill each of the compartments 54A, 54B and 54C, each compartment is provided with a filling aperture 78, preferably located on the top of the annular chamber 54, as shown most clearly in FIGS. 5, 7 and 11. Each filling aperture 78 is provided with a removable cover 80 which for ornamental purposes may also be of a floral design, the covers 80 being hingedly attached by any suitable means, such as staples 82, see FIG. 11. In order to provide additional weight for the covers 80, and in order to prevent lateral shifting of the covers when they are in their closed position, the covers are preferably provided with a pair of depending posts 84, see FIG. 10, which posts, when the cover 80 is in its closed position, extend through and are located adjacent opposite edges of opening 78. As will be obvious, when it is desired to fill any one of the compartments 54A, 54B and 54C, it is simply necessary to lift up the respective cover 80 and fill the respective compartment, again preferably until the level of solution reaches approximately the level defined by the joint between top wall 50 and bottom wall 52.

It will be understood that in operation and use the feeder 48 is basically identical to the feeder 10. The compartmenting of the annular reservoir 54 tends to minimize tipping and tilting of the feeder; and, in addition, if the feeder 48 is used in an area where there are not an excessive number of hummingbirds, then one or two of the compartments can be closed off and not used. This is a desirable feature, since the aqueous sugar solution used for feeding hummingbirds will normally ferment in approximately a week's time and hence normally has to be changed approximately once a week. Thus, if use of the feeder 48 is sufficiently minimal, then it is obviously more convenient to simply fill one compartment and close off the others.

It will also be noted that the design and construction of both the feeder 10 and the feeder 48 is such that the feeders are easy to clean. This is particularly important in hummingbird feeders, since, as indicated above, the sugar and water solution used ferments in about a week, and for that reason feeders of the instant type need to be washed about once a week with warm water. The feeders of the present invention can easily be so washed by simply depositing them in a sink full of warm water and then inverting them so that the water will quickly drain out through the feed openings and the filling apertures.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms shown herein and described except insofar as indicated by the scope of the appended claims.

What is claimed is:

1. A hummingbird feeder comprising a reservoir having a top wall and a bottom wall, each having an outwardly extending peripheral marginal flange in alignment with and abutting each other, means securing said flanges to each other whereby said top and bottom walls define an enclosure constituting the aforesaid reservoir, a feeding station positioned in said top wall adjacent to but spaced from said marginal flange, said feeding station comprising a feed opening in said top wall, an insert member comprising a substantially flat top flange surrounding said feed opening and secured to the outer surface of said top wall, said insert member further comprising an elongated tube extending snugly through said feed opening into said reservoir, a separate filling opening in said top wall, and means for covering said filling opening, said means being movable to expose said filling opening when it is desired to fill said reservoir.

2. In the feeder of claim 1, said top flange comprising a floral design.

3. In the feeder of claim 1, the inner diameter of said elongated tube gradually decreasing from top to bottom.

4. In the feeder of claim 3, said elongated tube having a diameter of approximately one-fourth inch at its top end, a diameter of approximately one-eighth inch at its inner end, and a length of approximately one-half inch.

5. In the feeder of claim 1, a plurality of vertical partitions dividing said reservoir into a plurality of discrete compartments, each compartment having at least one feeding station and one filling opening.

6. In the feeder of claim 5, said top and bottom walls defining an annular reservoir, said partitions being three in number and being equally spaced from each other, whereby to divide said reservoir into three equal compartments.

7. In the feeder of claim 1, the means for securing said flanges to each other comprising a U-shaped channel member extending completely around the periphery of said feeder in clamping relation to said abutting flanges.

* * * * *